United States Patent [19]
Klein

[11] Patent Number: 5,987,551
[45] Date of Patent: Nov. 16, 1999

[54] ATTACHMENT OR INTEGRATION OF A BIOS DEVICE INTO A COMPUTER SYSTEM USING LOCAL BUS

[75] Inventor: Dean A. Klein, Eagle, Id.

[73] Assignee: Micron Electronics, Inc., Nampa, Id.

[21] Appl. No.: 08/940,214

[22] Filed: Sep. 30, 1997

[51] Int. Cl.⁶ .................................................. G06F 13/14
[52] U.S. Cl. .......................... 710/126; 710/123; 710/121; 710/122
[58] Field of Search ............................... 395/750.01, 728, 395/821, 306, 733, 288, 303, 301, 302

[56] References Cited

U.S. PATENT DOCUMENTS

| | | | |
|---|---|---|---|
| 4,933,845 | 6/1990 | Hayes ........................................ | 364/200 |
| 5,414,820 | 5/1995 | McFarland et al. . | |
| 5,450,458 | 9/1995 | Price et al. . | |
| 5,457,785 | 10/1995 | Kikinis et al. . | |
| 5,522,076 | 5/1996 | Dewa et al. . | |
| 5,584,040 | 12/1996 | Curt et al. . | |
| 5,594,874 | 1/1997 | Narayanan et al. . | |
| 5,596,735 | 1/1997 | Hervin et al. . | |
| 5,596,740 | 1/1997 | Quattromani et al. . | |
| 5,623,691 | 4/1997 | Clohset et al. ........................... | 395/821 |
| 5,721,882 | 2/1998 | Singh ....................................... | 395/500 |
| 5,778,431 | 7/1998 | Rahman et al. . | |
| 5,794,054 | 8/1998 | Le et al. ................................... | 395/728 |
| 5,802,324 | 9/1998 | Wunderlich et al. . | |
| 5,809,262 | 9/1998 | Potter ....................................... | 395/309 |
| 5,826,015 | 10/1998 | Schmidt ............................... | 395/187.01 |
| 5,835,960 | 11/1998 | Keene et al. . | |

OTHER PUBLICATIONS

Intel data sheets for 28F200BX–T/B and 28F002BX–T/B, at least as early as Jun. 4, 1997.

Primary Examiner—Ayaz R. Sheikh
Assistant Examiner—Tim Vo
Attorney, Agent, or Firm—Dorsey & Whitney LLP

[57] ABSTRACT

Chipset or a device for attachment of the ROM BIOS within the system architecture. Although normally attached to the ISA bus, the ROM BIOS may be attached to an alternate bus (typically a higher-performance bus) located within the system, thereby potentially eliminating the ISA bus from the computer system.

21 Claims, 4 Drawing Sheets

ATTACHMENT OR INTEGRATION OF A BIOS DEVICE INTO A COMPUTER SYSTEM USING LOCAL BUS

RELATED APPLICATIONS

This application is related to the following patent applications, filed on even date herewith: Ser. Nos. 08/941,619, 08/940,743, 08/941,663, 08/940,215, and 08/941,664.

This application incorporates by reference application Ser. Nos. 08/941,619 and 08/941,663.

FIELD OF THE INVENTION

The present invention relates generally to the use of the ROM BIOS in a personal computer. More particularly, the present invention relates to the manner in which the ROM BIOS is integrated into or attached to the computer system.

BACKGROUND

Over the past fifteen years, continual advances in microprocessor technology have pushed the performance of personal computers to increasingly higher levels. New applications for personal computers have required significant processing power, and also have required significant amounts of data to be transferred between the computer's central processing unit and peripheral devices. This has prompted attempts to improve the manner in which peripheral devices communicate with the processor. And as a result, many changes have been made to the manner in which peripheral devices and the like are attached to the processor.

Normally, peripheral devices communicate with the processor through some form of an expansion bus. One of the earliest bus architectures used for personal computers is what has become known as the AT Attachment or the Industry Standard Architecture (ISA) bus. Over the years, however, additional expansion bus architectures have been developed, some of which have become part of mainstream personal computing. These additional architectures include IBM's Micro Channel Architecture (MCA) bus, and the Extended ISA bus (EISA) bus. More recently, local bus or mezzanine bus architectures, such as the VL bus architecture and the Peripheral Component Interconnect (PCI) bus architecture, have become a standard feature in modern personal computers.

As the evolution of expansion busses has progressed, peripheral devices once attached to the ISA bus (or some other legacy bus) have been moved to more modern and higher performance buses, such as the PCI bus. For example, it is now common for the video controller and the hard drive controller, once found on the ISA bus, to be attached to the higher-performance PCI bus.

Nevertheless, most modern computers still typically include the legacy ISA bus for accommodating other older, legacy devices. Although many peripherals are no longer attached to the ISA bus, one common device that does remain on the ISA bus is the ROM BIOS. This device has remained on the ISA bus for a number of reasons, including the fact that moving it to another bus is not easily accomplished. Thus, a need exists for moving the ROM BIOS to a different bus.

SUMMARY

In some embodiments of the present invention, the ROM BIOS is relocated to another bus within the system architecture. For systems where the ROM BIOS is the last remaining device on the ISA bus, this move potentially eliminates the need for the ISA bus and/or associated circuitry. Thus, the present invention may allow peripheral devices to be consolidated on a smaller number of busses, and potentially, on a single bus. This consolidation may reduce the cost and complexity of personal computers. In addition, relocating the ROM BIOS to an alternate point within the system may in some circumstances improve performance.

For example, in one embodiment, the present invention is a system or method for accessing a BIOS device in a computer system having a central processing unit, a mezzanine bus, and a BIOS device on the mezzanine bus. The computer system carries out the acts of (a) presenting an address to the BIOS device by placing the address on the mezzanine bus; (b) receiving data stored in the BIOS device by sampling a portion of the mezzanine bus; and (c) transferring the data to the central processing unit. Additional embodiments and features, and the nature of the present invention may be more clearly understood by reference to the following detailed description of the invention, the appended claims, and to the several drawings herein.

DETAILED DESCRIPTION

Figure 1:
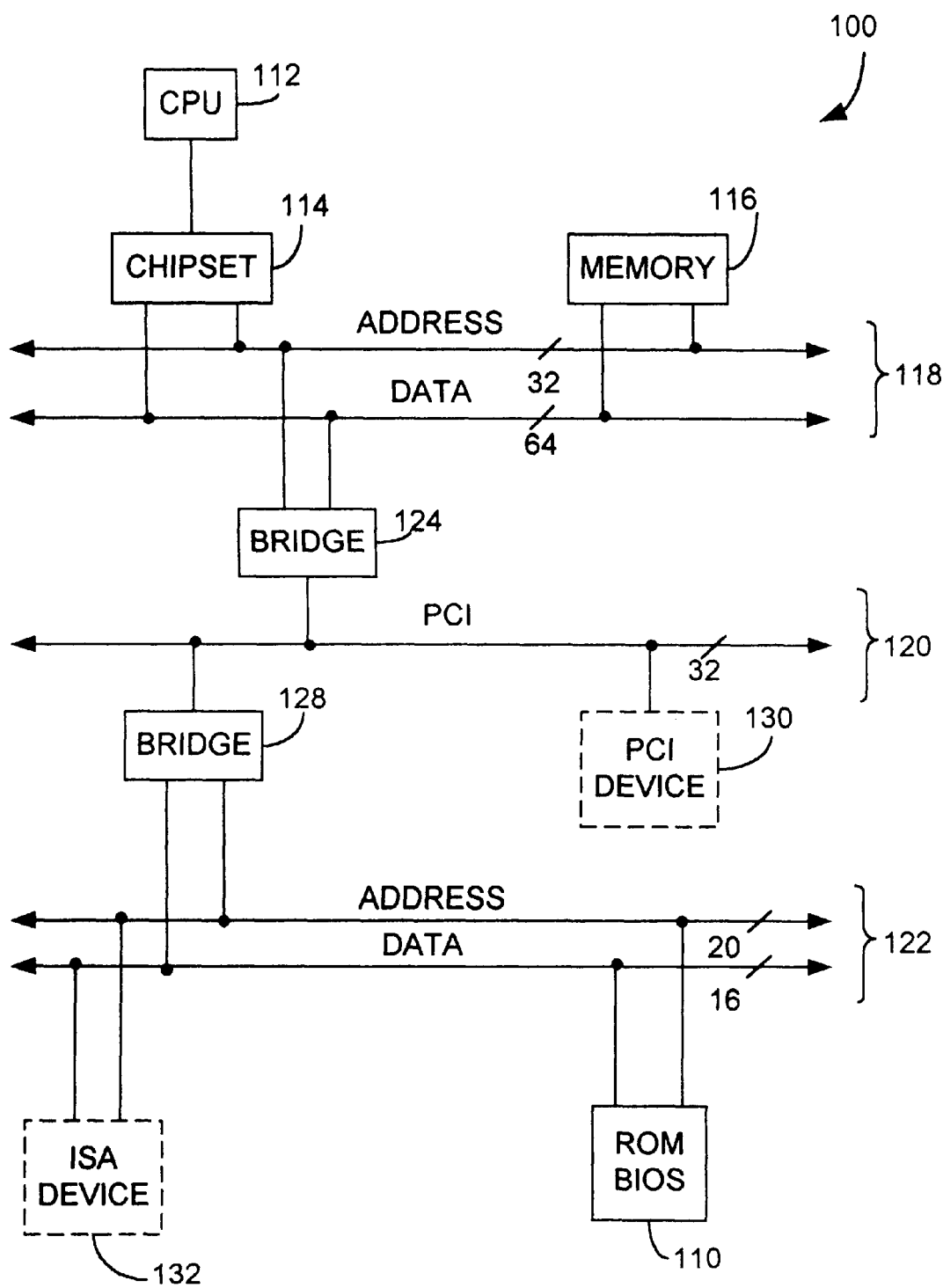
FIG. 1 is a block diagram of a prior art personal computer employing an ISA bus, a PCI bus, and also a system bus.

FIG. 1 is a block diagram of a prior art x86 personal computer 100, including a processor 112 and a chip set or core logic 114. The processor 112 is connected to the system memory bus 118 by the chip set 114. Typically, in a computer based on Intel's Pentium, the memory bus 118 has a 32-bit address bus and also a 64-bit data bus. In the embodiment shown, the computer 100 also includes two additional busses, the Peripheral Component Interconnect (PCI) bus 120 and the Industry Standard Architecture (ISA) bus 122.

The PCI bus 120 is a typically a 32-bit bus on which data and address signals are multiplexed. (The PCI bus 120 can be extended to 64 bits.) The PCI bus is a type of local bus. Specifically, it is a mezzanine bus that is connected to the system bus 118 through bridge logic 124. A PCI peripheral device 130, which might be a video adapter or hard disk drive controller, is shown attached to the PCI bus in FIG. 1. The PCI bus 120 is also connected to the ISA bus 122 in FIG. 1 through the ISA bridge 128.

The ISA bus 122 shown in FIG. 1 is the standard bus found in almost every IBM-compatible computer manufactured in the last fifteen years. The ISA bus 122 includes a 20-bit address bus and a 16-bit data bus. Attached to the ISA bus 122 is an ISA peripheral device 132. Also connected to the ISA bus 122 is the ROM BIOS 110. As is well known in the art, stored in the ROM BIOS are various support routines and data used at power-up, as well as I/O support routines for accessing the keyboard, the graphics adapter, and other devices.

Often the ROM BIOS 110 in FIG. 1 is implemented by a non-volatile, electrically block-erasable, programmable read-only memory device (e.g., a FLASH memory device). Such a device can be periodically erased and rewritten, thereby permitting re-programming of the BIOS region. ROM BIOS access can be very slow, particularly where a FLASH ROM is used. For this reason, the BIOS routines are usually switched out of the ROM device it initially occupies, and into faster "shadow" memory (e.g., DRAM) at the same addresses. The contents of the ROM BIOS may be compressed, so it may be necessary to decompress it as it is moved into shadow RAM. The movement of the BIOS into shadow RAM typically takes place just after system reset, and once complete, the ROM device is generally not accessed again until a system reset. Once BIOS is shadowed, all accesses to the BIOS are directed to shadow RAM, rather than the ROM device. Because this shadow RAM is significantly faster than the ROM device, access to the BIOS routines is much faster.

The BIOS routines which may be stored in the device 110 in FIG. 1 are generally required to be accessible only to the CPU and, in a 32-bit address space, are addressed at the top 256 Mb of memory space (since that is where the CPU starts after a reset) and in the top 128 Kb of the low 1 megabyte of memory space. For 32-bit memory addresses where a memory cycle is indicated by a MEMCYCLE signal, and where a ROMEN signal indicates whether access to the ROM BIOS device is enabled, an access to a BIOS routine can be detected when the following expression evaluates to a logical one:

MEMCYCLE*(A31*A30*A29*A28+/
(A31::A20)*A19*A18*A17*ROMEN), where "Axx" corresponds to address bit "xx." The signal ROMEN would be controlled by bits in the configuration registers 190 for the chipset 114. (See FIG. 2.) After system reset, read access to the ROM device is permitted and writes are permitted in the same addresses in the shadow RAM, which allows the move/decompress operation to take place. Once shadowing has occurred, the ROM would no longer be accessible. However, read operations to the corresponding shadow RAM address space would be permitted, but write operations to this region of RAM would be prohibited. (Note that during programming of the (FLASH) ROM BIOS device, erasure or write operations can be performed on the ROM device.)

The shadowing procedure known in the art and described above avoids subsequent accesses to the ROM device after its contents are shadowed to faster RAM, but this shadowing procedure does not eliminate the need for the ROM device. The ROM device still will typically be required so that the BIOS routines can be stored in a non-volatile manner. These BIOS routines must also be accessible by the CPU, which has traditionally required an ISA bus. Yet the ROM BIOS may be one of the only devices on the ISA bus, so the ROM BIOS and the other support it requires (e.g., the ISA bus and associated logic) can require a significant amount of hardware, and can account for a non-trivial percentage of the cost of a computer system. In some embodiments, the present invention moves the ROM BIOS to another bus within the computer system, thereby eliminating the ROM BIOS' dependence on the ISA bus. In some computer systems, this will allow the ISA bus to be eliminated from the system entirely, saving significant costs.

Figure 2:
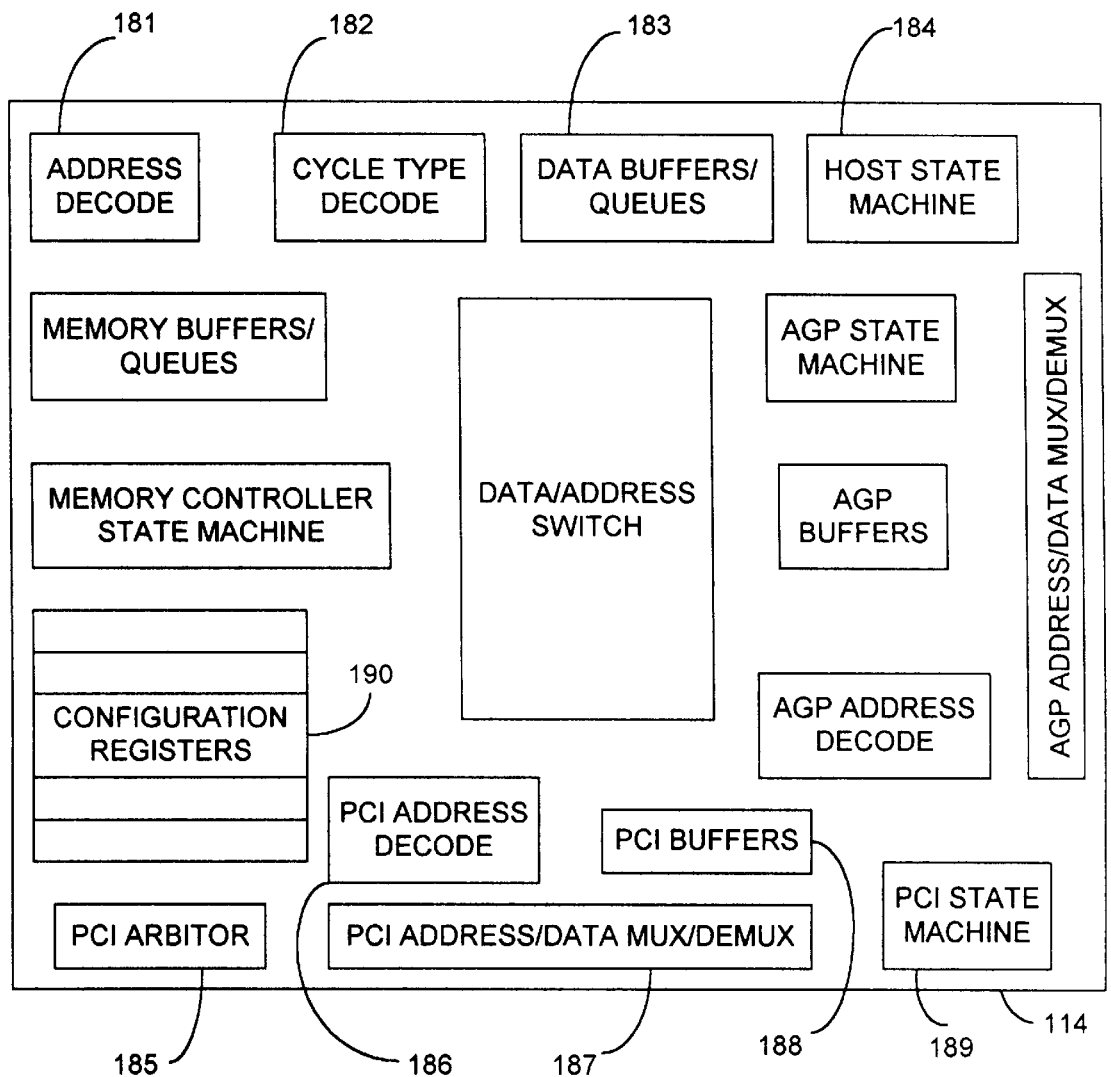
FIG. 2 is a block diagram of the components of the core logic or chipset typically used in modern personal computers.

FIG. 2 is a block diagram of the chip set or core logic 114 used in some embodiments of the present invention. The chip set 114 includes logic for address decoding 181, logic for cycle type decoding 182, data buffers 183, and a host state machine 184. Numerous other logic modules are also shown in FIG. 2, including modules for PCI arbitration 185, PCI address decoding 186, PCI Address/Data Mux/Demux 187, PCI Buffers 188, and a PCI State Machine 189. The chip set 114 or core logic is often constructed of multiple discrete parts, each of which includes one or more of the modules shown in FIG. 2. However, the same functionality could be obtained in another embodiment by integrating one or more of these separate modules into a single part.

Figure 3:
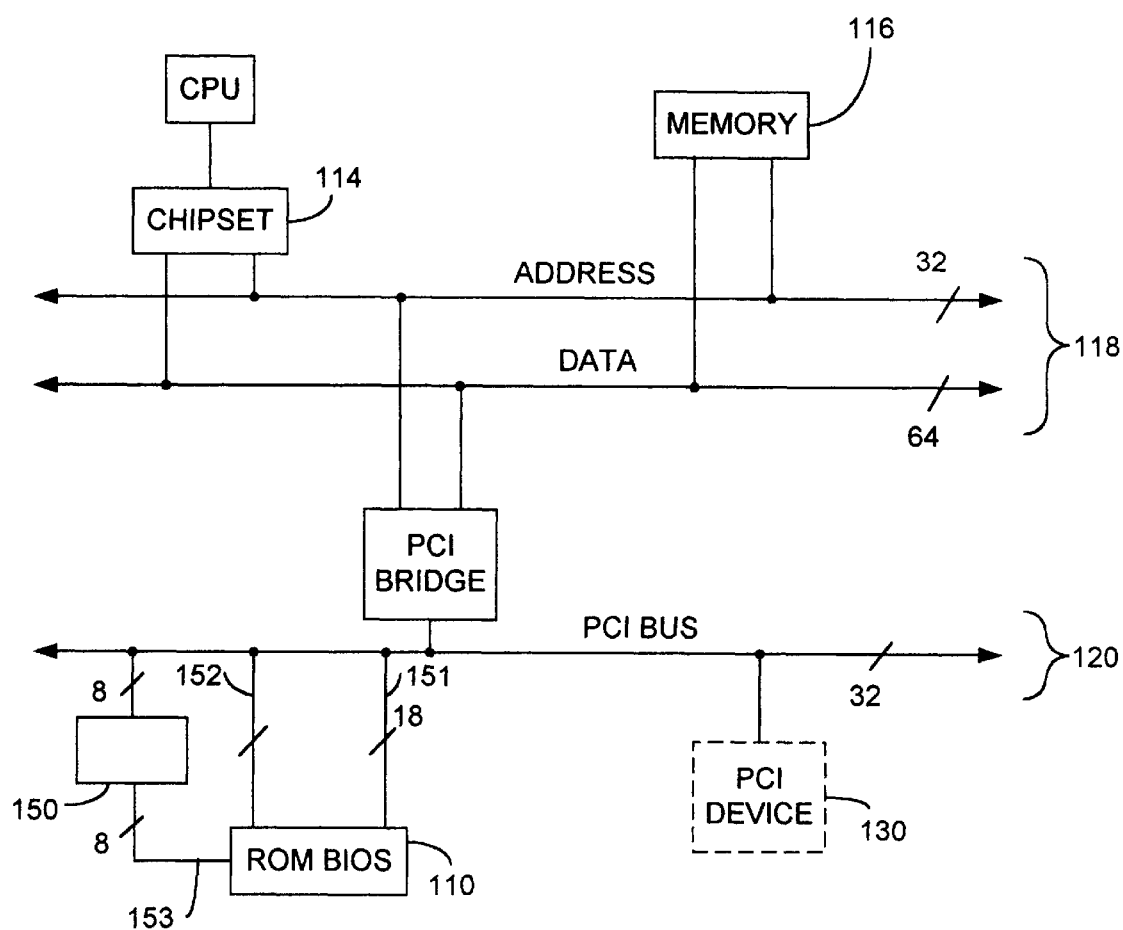
FIG. 3 is a block diagram of a personal computer where the ROM BIOS is attached to the PCI bus.

FIG. 3 shows a block diagram of a personal computer based on the x86-based processor. In the embodiment shown, the ROM BIOS 110 is attached to the 32-bit PCI bus, rather than to the ISA bus as shown in FIG. 1. The eight-bit data path from the ROM BIOS is attached to the PCO bus through a buffer or latch 150, which buffers the data between the ROM BIOS and the PCI bus. Normally, eighteen address lines are used for the ROM BIOS, and these address ports are connected to the PCI bus over lines 151. The additional lines 152 may be used for control signalling.

Figure 4:
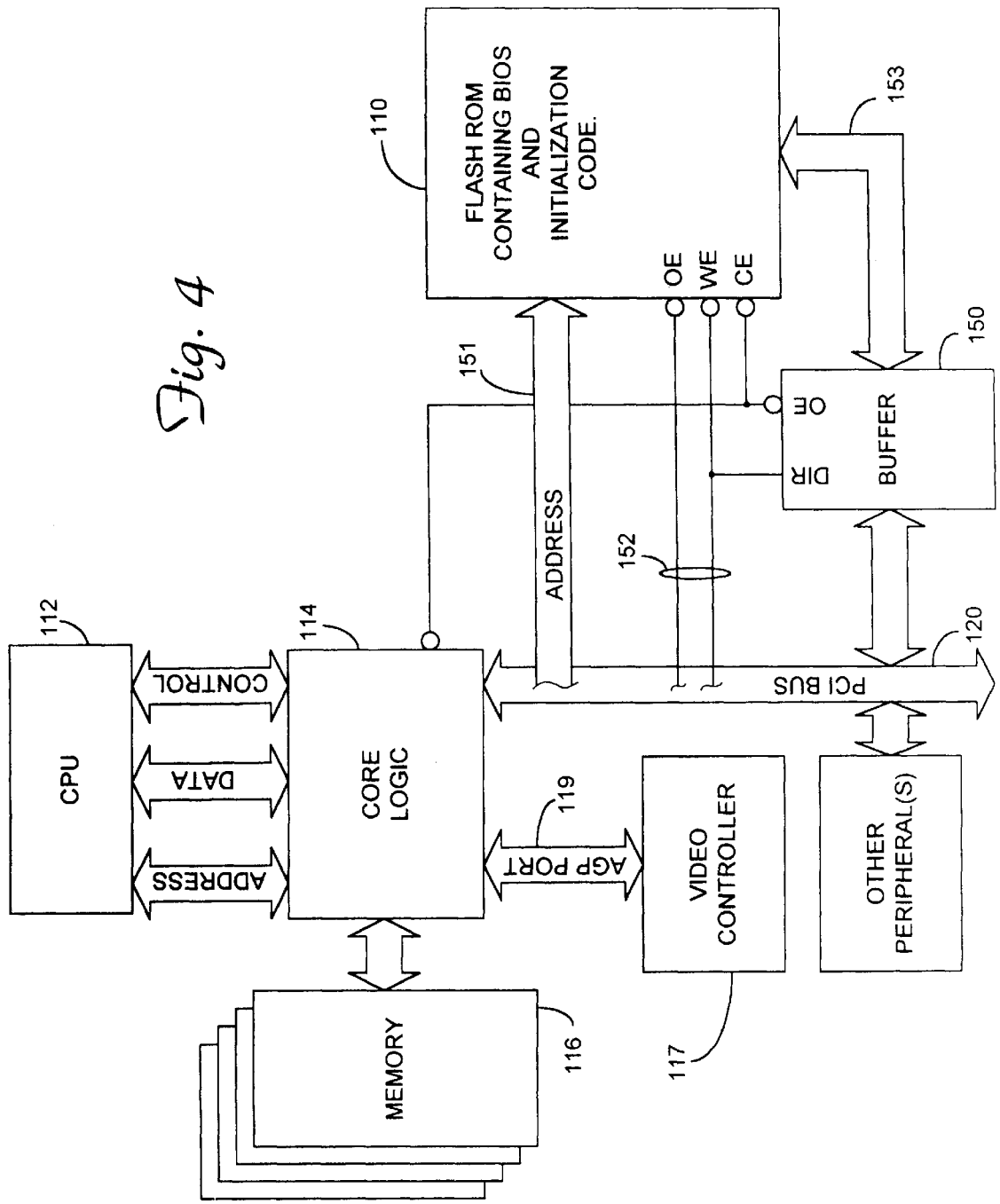
FIG. 4 is a more detailed block diagram of the interface between the ROM BIOS and the PCI bus in FIG. 3.

FIG. 4 is a more detailed block diagram of FIG. 3, where the ROM BIOS 110 is implemented as a FLASH ROM device that contains the BIOS routines and associated initialization code. The ROM addresses are passed from the PCI bus 120 to the ROM BIOS 110 over address lines 151, and the data moves between the ROM BIOS 110 and the PCI bus 120 over bus 153 and through buffer 150. Signals 152 are used to control the transfer of data to or from the FLASH memory device 110. The core logic 114 controls access to the main memory 116, and interfaces with the video controller 117 through the accelerated graphics port bus 119. The core logic 114 also administers the transfer of data from the ROM BIOS 110.

In operation, a ROM BIOS access is initiated by ensuring that the control logic 114 is the master of the PCI bus. Normally, accesses to the ROM BIOS occur prior to any initialization of any other I/O devices that may be masters of the PCI bus, so the core logic 114 will likely already be the master of the PCI bus 120. In any event, normal arbitration can ensure that the core logic 114 is the PCI bus master.

The CPU 112 then accesses the ROM BIOS 110 by bypassing the normal PCO state machine and address data paths, and placing an address on the PCI bus 120. In the embodiment shown, a normal PCI cycle is not initiated, and the PCI buffers are not used for buffering the address and data. Rather, the core logic 114 places the ROM address, which is typically an 18 bit quantity, on a portion of the PCI bus (e.g., lines AD0 to AD17), and it is thereby presented to the ROM BIOS 110 over lines 151. After an appropriate period of time, the ROM BIOS responds by placing the addressed data (typically an 8 bit quantity) on bus 153. The data is gated through the buffer 150, and onto a different portion of the PCI bus (e.g., lines AD18 to AD25). Thus, the address and data occupy two different portions of the PCI bus. When the access to the ROM BIOS 110 is complete, the chip enable signal is removed and the PCI bus 120 and the core logic 114 return to their normal operating mode. The data may also be multiplexed with the ROM BIOS address on some of the AD lines (e.g., AD0 to AD7), but it is preferred that different AD lines be used for the address and data as described.

The control signals shown in FIG. 4 include output enable (OE), write enable (WE), and chip enable (CE) signals. These control signals (as well as any others that are not shown) may be passed to the ROM BIOS on other AD lines (e.g., AD26 and AD27) on the PCI bus. In another embodiment, however, PCI control lines that are normally used for PCI control signals (such as the CBE, TRDY, and IRDY control lines) can be used as the control lines for the ROM BIOS control signals. And if the control portion of the PCI bus is used in this manner, the associated PCI logic may also be bypassed in a ROM BIOS access.

The width of the data from the ROM is normally 8 bits, whereas the CPU data path is normally 32 or 64 bits. In some embodiments of the present invention, the core logic 114 sequences the lower address bits presented to the ROM BIOS 110 so that more than one eight-bit quantity can be read from the ROM BIOS. For example, for a 64-bit CPU data path, the core logic 114 can sequence the lower three bits of the ROM address eight times so that eight bytes of data are read from the ROM BIOS 110 in succession, thereby completing a full 64-bit data word. Using this or similar techniques, the core logic 114 is capable of constructing a larger data quantity (e.g., 32-bits or 64 bits) by aggregating multiple eight bit data units from the ROM BIOS. It may also be more efficient in some embodiments for the core logic to construct a full line of data (e.g., four 32-bit quantities or two 64-bit quantities). Other performance-enhancing techniques, such as the shadowing operation described above, could also be used with the present invention, and should be understood to be within the scope of the present invention.

By configuring a computer system as shown in FIGS. 3 and 4, it is possible to attach the ROM BIOS to the PCI bus 120, thereby potentially eliminating the need for the ISA bus 122. The present invention will therefore reduce system complexity and manufacturing costs, and may also enhance system performance. Although a discrete implementation is shown in FIGS. 3 and 4 using multiple parts, it should be understood that the present invention encompasses implementations and embodiments where some or all of the equivalent logic is integrated into the core logic 114 or into the ROM BIOS or FLASH memory device 110.

Although the present invention has been shown and described with respect to preferred embodiments, various changes and modifications that are obvious to a person skilled in the art to which the invention pertains, even if not shown or specifically described herein, are deemed to lie within the spirit and scope of the invention and the following claims.

What is claimed is:

1. A computer comprising:

a central processing unit;

a mezzanine bus;

a BIOS device that is connected to the mezzanine bus; and core logic connecting the central processing unit to the mezzanine bus comprising:

a state machine for initiating mezzanine bus cycles in a normal mode; and logic for bypassing the state machine when a BIOS access is initiated;

wherein the core logic is configured such that if a BIOS access is initiated:

the core logic becomes master of the mezzanine bus;

a mezzanine bus cycle in normal mode is not initiated; and the core logic places the address of the BIOS device on the mezzanine bus.

2. The computer of claim 1, further comprising:

system memory that is connected to the core logic, wherein the core logic controls memory operations involving the central processing unit and the system memory.

3. The computer of claim 1, wherein the mezzanine bus is a PCI bus.

4. The computer of claim 2, wherein the core logic controls BIOS operations involving the central processing unit and the BIOS device on the mezzanine bus by;

receiving data stored in the BIOS device when it is accessed by sampling a portion of the mezzanine bus, and transferring the data to the central processing unit.

5. The computer of claim 3, wherein the address presented to the BIOS device and the data read from the BIOS device occupy different AD lines on the PCI bus.

6. The computer of claim 4, wherein the core logic sequences a plurality of low-order bits on the BIOS device address so that data from more than one addressable location is read from the BIOS device before the data is transferred to the central processing unit.

7. The computer of claim 5, wherein the control signals used in accessing the BIOS device are passed to the BIOS device over AD lines on the PCI bus.

8. The computer of claim 6, wherein the core logic transfers at least some of the contents of the BIOS device to faster memory at system start-up.

9. The computer of claim 7, wherein a non-volatile, electrically-erasable, programmable read-only memory device contains BIOS instructions.

10. The computer of claim 8, wherein the address presented to the BIOS and the data read from the BIOS device occupy different portions of the mezzanine bus.

11. The computer of claim 9, wherein eight-bit data units are stored in an eighteen-bit address space within the BIOS device.

12. Core logic that controls BIOS operations in a computer system, wherein the BIOS operations involve a central processing unit and a BIOS device on a mezzanine bus, the core logic comprising:

a port for communicating with the central processing unit;

a port for connecting to the mezzanine bus;

logic for initiating mezzanine bus cycles;

logic that bypasses the logic for initiating mezzanine bus cycles when the BIOS device is accessed;

logic that ensures that the core logic is the master of the mezzanine bus;

logic that presents an address to the BIOS device by placing the address on the mezzanine bus;

logic that receives data stored in the BIOS device at the address by sampling a portion of the mezzanine bus; and logic that transfers the data to the central processing unit.

13. The core logic of claim 12, further comprising logic that sequences a plurality of low-order bits on the address presented to the BIOS device so that data from more than one addressable location is read from the BIOS device before the data is transferred to the central processing unit.

14. The core logic of claim 12, wherein the mezzanine bus is a PCI bus.

15. The core logic of claim 13, further comprising logic that transfers at least some of the contents of the BIOS device to faster memory at system start-up.

16. The core logic of claim 14, wherein the address presented to the BIOS device and the data read from the BIOS device occupy different AD lines on the PCI bus.

17. Core logic for controlling BIOS operations in a computer system, where the BIOS operations involve a central processing unit and a BIOS device on a mezzanine bus, the core logic comprising:

means for initiating mezzanine bus cycles;

means for bypassing the logic for initiating mezzanine bus cycles when the BIOS device is accessed;

means for ensuring that the core logic is the master of the mezzanine bus;

means for presenting an address to the BIOS device by placing the address on the mezzanine bus;

means for receiving data stored in the BIOS device at the address by sampling a portion of the mezzanine bus; and means for transferring the data to the central processing unit.

18. The core logic of claim 17, further comprising hardware for sequencing a plurality of low-order bits on the address presented to the BIOS device so that data from more than one addressable location is read from the BIOS device before the data is transferred to the central processing unit.

19. The core logic of claim 17, wherein the mezzanine bus is a PCI bus.

20. The core logic of claim 18, further comprising means for transferring at least some of the contents of the BIOS device to faster memory at system start-up.

21. The core logic of claim 19, wherein the address presented to the BIOS device and the data read from the BIOS device occupy different AD lines on the PCI bus.

* * * * *

UNITED STATES PATENT AND TRADEMARK OFFICE
CERTIFICATE OF CORRECTION

PATENT NO. : 5,987,551
DATED : November 16, 1999
INVENTOR(S) : Klein

It is certified that error appears in the above-indentified patent and that said Letters Patent is hereby corrected as shown below:

| Column | Line | Reads | Should Read |
|--------|------|-------|-------------|
| 1 | 44 | modem | modern |
| 4 | 13 | PCO | PCI |
| 4 | 40 | PCO | PCI |

Signed and Sealed this

Tenth Day of April, 2001

Attest:

NICHOLAS P. GODICI

Attesting Officer     Acting Director of the United States Patent and Trademark Office